United States Patent Office 3,038,289
Patented June 12, 1962

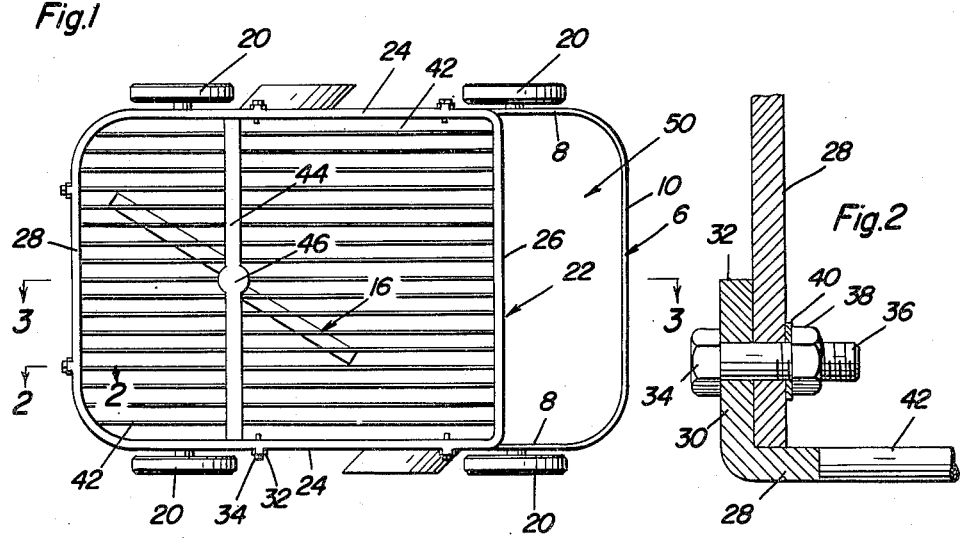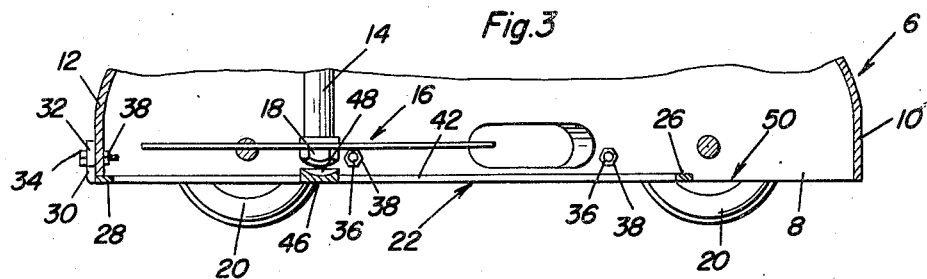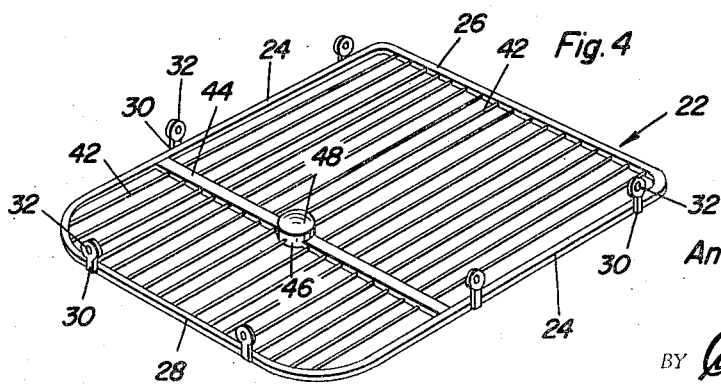

3,038,289
ROTARY LAWN MOWER GUARD
Andrew C. Cross, Westfield, Ill.
Filed May 12, 1959, Ser. No. 812,736
2 Claims. (Cl. 56—255)

The present invention relates to an improved openwork grille-type guard which is applicable to the skirt portion of a power lawn mower having a rotary cutting blade and which is adapted to underlie the cutting blade, or blades, in a manner to promote safety to the operator of the mower or others who may be within the vicinity of the mower in use, which minimizes property damage and provides an efficient fender for the otherwise exposed parts of the machine itself.

As is well-known the usual supporting and transporting wheels on the walls of the skirt portion of a lawn mower housing are necessarily designed to space the lower edge portions thereof above the surface traversed. When the mower is maneuvered, and its blade inadvertently contacts exposed tree roots, stones, golf balls or similar objects there is an ever present possibility of unexpected injury and damage. The problem has given rise to the adoption and use of guards of one type or another for the blade. The objective of this invention is to structurally and functionally improve upon prior art fenders and guards. This is accomplished through the medium of a simple, practical and efficient grille-type fender which better serves the purpose for which guards in this category are intended.

Briefly, the guard which has been expressly constructed and designed for this purpose is characterized by an unusually simple frame having appropriate means whereby its component portions may be bolted or otherwise suitably attached to and mounted on the cooperating walls of the housing's skirt. This frame is provided with longitudinal coplanar spaced parallel guard wires or rods which allow the blades of grass to rise through the spaces whereby they may be effectually severed. In carrying out the invention the frame is generally rectangular in plan but will vary in shape depending on the skirt or housing to which it is to be attached. The rods completely underlie and are spaced below the cutter blades.

The invention also features the construction wherein the rear end portion is spaced forwardly of the rear wall of the skirt to provide an unobstructed opening which reduces the likelihood of clogging and also provides a clean-out space.

The invention also features the construction wherein a cross-brace or stabilizer is incorporated to rigidify the over-all fender and to provide an abutment. This abutment is in alignment with the usual nut-equipped lower end of the driven shaft of the cutter blade. In addition the upper end is recessed so that it provides a grease cup which may be charged with a suitable grease or lubricant to prevent damage under such conditions where the underlying portion of the guard is forcibly pressed against the shaft end.

Other objects, features and advantages will become more readily apparent from the following description and the accompanying illustrative, but not restrictive drawing.

In the drawing, wherein like numerals are employed to designate like parts throughout the views:

FIG. 1 is a bottom plan view of a power lawn mower with a rotary cutter equipped with the improved grille-like or equivalent protective guard of this invention.

FIG. 2 is an enlarged or exaggerated detailed section taken on the plane of the line 2—2 of FIG. 1 looking in the direction of the arrows.

FIG. 3 is an enlarged central view with parts in section and elevation taken on the longitudinal line 3—3 of FIG. 1.

FIG. 4 is a perspective view of the guard by itself.

As best seen in FIG. 3 the skirt portion 6 of the lawn mower housing has longitudinal side walls 8, a rear or trailing wall 10 and a leading or front wall 12. The power driven (not detailed) vertical shaft which is suspended in the housing space is denoted at 14 and the cutter head or blade (or blades) is denoted at 16 and is removably secured by a nut or the like 18 in operating position on the lower end of the shaft. The cutter blade operates in a plane above the lower edges of the skirt walls. The side walls are provided with ground contacting, supporting and transporting wheels 20, the lower portions of which project below the skirt in the usual manner.

The improved fender or cutter guard is denoted generally by the numeral 22 in FIG. 4. It comprises a marginal frame which is shown as rectangular but may vary in plan design or configuration. The side frame members are denoted at 24, the rear frame member at 26 and the forward or front one at 28. In practice the means for attaching the frame will of course vary. Here simple lugs 30 are welded or otherwise fixed in place and extend above the plane of the frame where they terminate in attaching eyes 32 bolted in place as seen in FIG. 2. The bolt is denoted at 34 and pierces an opening provided in the skirt wall and the threaded inner end 36 is provided with an assembling end clamping nut 38 and an attending washer 40. The construction is such that the longitudinal spaced parallel guard wires or rods 42 of the grille 22 underlie the major portion of the open bottom of the skirt. The wires are spaced and parallel to permit the blades of grass to pass upwardly therethrough and be exposed to the cutting action of the blade means 16. The aforementioned transverse or cross-brace is a bar 44 extending between the side frame members 24 and is in alignment with the lower portion of the shaft 14. The central portion of the cross-brace is provided with a circular or suitably shaped and constructed integral abutment 46. This is directly beneath and in alignment with the lower end of the shaft 14 as shown in FIG. 3. The top or upper side of the abutment is recessed to provide a concavity 48 which in practice is charged with grease. Thus this abutment becomes an end-thrust grease cup. However, it is normally spaced below the nut 18 as illustrated. Since the rods 42 are slightly bendable it will be evident that there are times when the guard, operated over certain objects, will lift the entire mower off the ground and the guard may flex and become the supporting or suspending means. Under these circumstances the grease cup coming into engagement with the nut 18 will prevent damage and will allow the rotating shaft and cutter head to turn freely.

The rear end of the cutter guard is spaced forwardly from the rear wall of the skirt to provide a clearance and clean-out space or opening in the manner denoted at 50 in FIG. 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power lawn mower comprising a housing including an open-bottomed skirt having front, rear and side walls surrounding and defining therebetween said open bottom, the lower edges of said walls being coplanar, supporting wheels disposed exteriorly of said side walls and rotatably supported by said housing and projecting to a common plane below said lower edges, a vertical shaft rotatably journaled in said housing and having its lower end projecting into the open bottom within said side walls and terminating in vertically spaced position above said lower edges, a cutting blade secured to said lower end and rotatable within said walls in a horizontal plane above the plane of said lower edges, a blade shielding and guarding fender for said blade comprising a grille positioned directly below said side walls and secured to the latter and completely underlying said blade, said grille having a frame with laterally spaced rods each extending the entire length of the frame in the direction of travel of the mower, said rods having a single transverse crossbrace with its ends secured to opposite sides of the frame and overlying said rods with the space between said rods being unobstructed to the passage of grass therethrough along the entire length of said rods exclusively of said crossbrace and with said grille being free of any obstructions projecting downwardly from the underside thereof, the front end of said frame and grille being coextensive with and abutting and underlying the lower edges of the front and the forward portion of said side walls, the rear end of said grille terminating forwardly of the housing rear wall and providing an opening therebetween into the space between the grille and the top of the housing for escape of cuttings from said space, said crossbrace extending underneath the lower end of said vertical shaft in normally spaced relation thereto and having an abutment member projecting upwardly from the top surface of said crossbrace towards said lower end of said shaft, said abutment having a recess in its top surface adapted to receive lubricant and for receiving said shaft lower end upon upward flexure of said crossbrace.

2. The combination of claim 1 wherein said grille includes supporting and mounting brackets upon the front and side walls of the grille and projecting upwardly therefrom and embracing the exterior surface of the lower portion of the front and side walls of said housing, fasteners securing said brackets to said housing.

References Cited in the file of this patent

UNITED STATES PATENTS

| | | |
|---|---|---|
| 2,253,452 | Urschel | Aug. 19, 1941 |
| 2,318,430 | Spahn | May 4, 1943 |
| 2,539,779 | Grosso | Jan. 30, 1951 |
| 2,547,328 | Koch et al. | Apr. 3, 1951 |
| 2,557,598 | Daggett | June 19, 1951 |
| 2,906,082 | Mathis | Sept. 29, 1959 |
| 2,934,882 | Kaut | May 3, 1960 |